March 2, 1965
B. BRAUN
3,171,412
CONTAINER FOR BIOLOGICAL LIQUIDS
Filed June 18, 1959
3 Sheets-Sheet 1
FIG. 1
FIG. 2
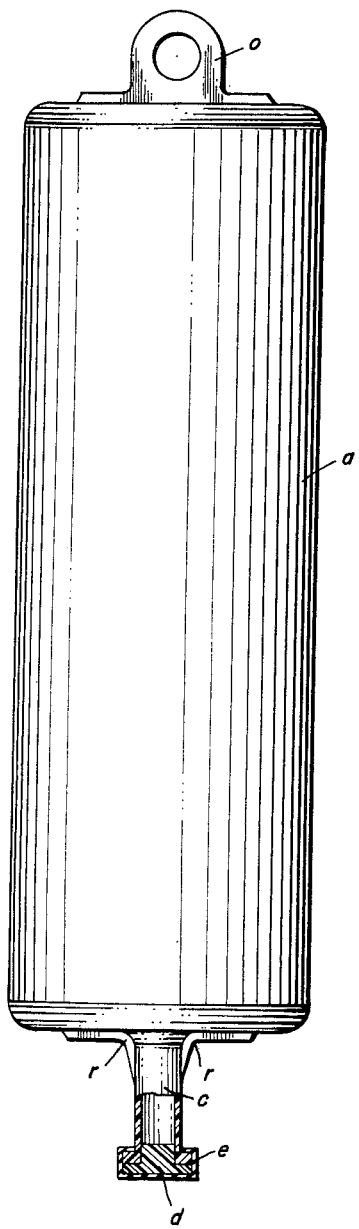
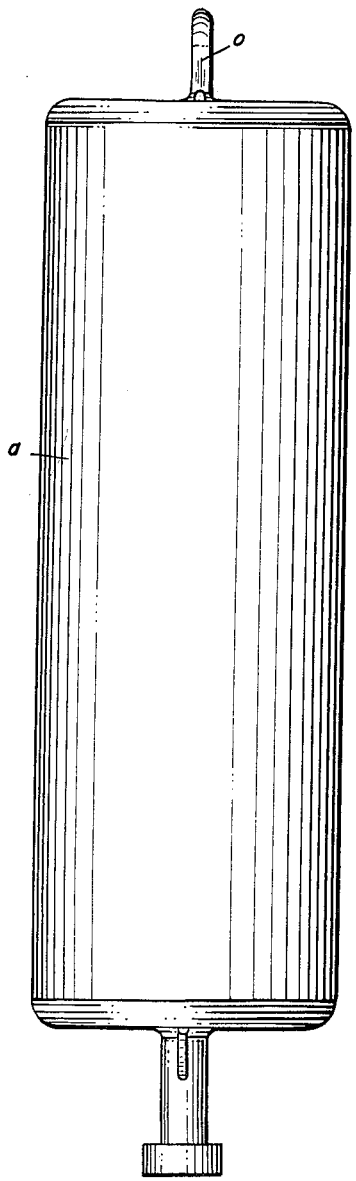
INVENTOR
BERND BRAUN
BY
ATTORNEYS March 2, 1965    B. BRAUN    3,171,412
CONTAINER FOR BIOLOGICAL LIQUIDS
Filed June 18, 1959    3 Sheets-Sheet 2

INVENTOR
BERND BRAUN

BY
ATTORNEYS

March 2, 1965     B. BRAUN     3,171,412
CONTAINER FOR BIOLOGICAL LIQUIDS
Filed June 18, 1959     3 Sheets-Sheet 3
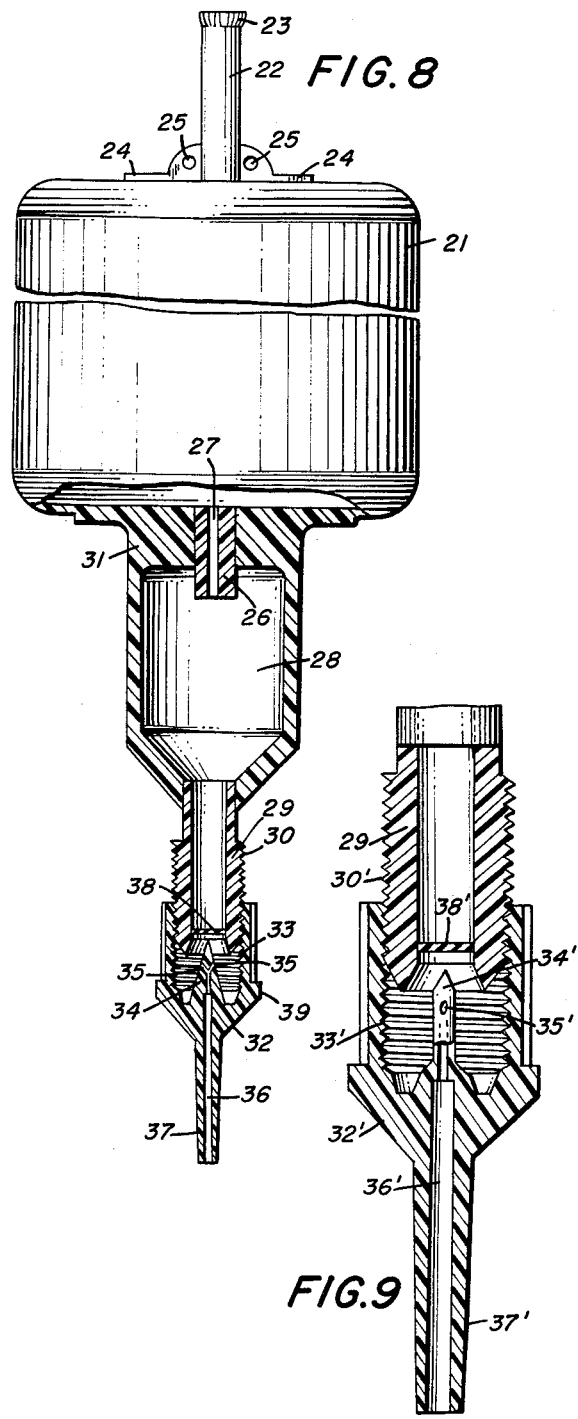
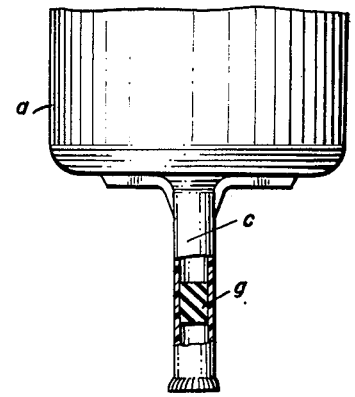
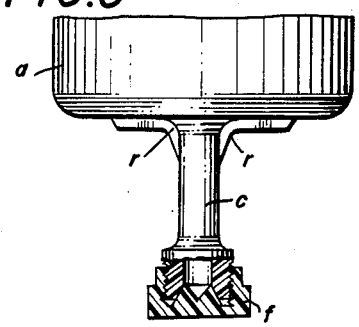
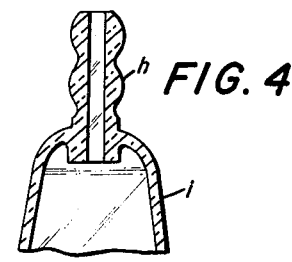
INVENTOR
BERND BRAUN
BY *Burgess, Dinklage & Sprung*
ATTORNEYS 3,171,412
CONTAINER FOR BIOLOGICAL LIQUIDS
Bernd Braun, Traenkeluke 1, Melsungen, Germany
Filed June 18, 1959, Ser. No. 821,148
Claims priority, application Germany, June 15, 1956,
B 40,678; Dec. 14, 1956, B 42,817; June 28, 1958,
B 49,429; July 10, 1958, B 49,577; Switzerland,
Aug. 22, 1958, 63,186
4 Claims. (Cl. 128—272)

This invention relates to a container for biological liquids. The invention more particularly relates to a flexible plastic container for receiving, preserving and storing blood and other biological liquids, such as blood substitutes and infusion solutions and the like.

This is a continuation in part application of co-pending U.S. application Serial No. 664,781, filed June 10, 1957, now abandoned.

In the past, sterilized glass bottles have generally been used for receiving, preserving, storing blood and other biological liquids. These glass bottles, due to their rigidity and fragile nature, had various disadvantages in use. In order to overcome these disadvantages, containers formed of flexible synthetic plastic sheeting with heat-sealed seams have been proposed. These plastic containers, however, did not prove completely satisfactory, since the heat-sealed seams are a source of potential leakage and the containers cannot be sterilized at high temperatures, as for example with the use of super-heated steam. With the use of thinner sheets of synthetic plastic, heat-sealing becomes increasingly difficult, and the seams become increasingly sensitive to break down, particularly during sterilization.

Thus, thin-walled containers of high pressure (low density) polyethylene possess the disadvantage that they may be sterilized only at temperatures of about 101 to 102° C. by steam in autoclaves. If these temperatures are exceeded, disturbing deformations of the container take place. Heretofore, reliable sterilization results were only possible in the case of high-pressure polyethylene containers where the sterilization was carried out under the specific temperature conditions of 101 to 102° C. and for a period of more than two hours as well.

Low-pressure (high density) polyethylene, on the other hand, is not necessarily well-suited for the production of plastic bags or containers, which are to be used for biological liquids, since this material is often too hard and inflexible. Consequently, such containers will not automatically collapse as the liquid is withdrawn therefrom in the manner so important for practical application. Furthermore, containers made from low-pressure polyethylene material are not optimumly transparent, so that visual examination of the liquid therewithin is not always conveniently possible.

Thin-walled plastic containers for storing biological liquids must satisfy a number of indispensable requirements. Among these is the requirement that the walls be soft and flexible and remain so in use, so that the containers upon emptying the contents therefrom may collapse automatically and fold easily. Where the walls have a thickness of generally from about 0.3 to 0.5 mm. they must be of such a character that no penetration of liquids, gases, bacteriae or fungi into the interior of the container will take place, or will there be any undesirable escape of the biological liquid from within the container. Moreover, the walls of the plastic containers must be sufficiently transparent and remain so during usage to permit adequate control by continual visual inspection of the contents. Most importantly, the containers must be heat-sterilizable, i.e. they must be able to withstand without damage subjection to temperatures above 100° C., which are necessary for sterilization.

One object of this invention is to provide a flexible, plastic container for biological liquids, which overcomes the above mentioned disadvantages.

A further object of this invention is to provide a method for the sterilization of the filled containers in accordance with the invention, using high sterilization temperatures, as for example with the use of super-heated steam.

These and still further objects will become apparent from the following description, read in conjunction with the drawings, in which FIG. 1 is a front elevation, partially in section, of an embodiment of a container in accordance with the invention;

FIG. 2 is a side elevation of the embodiment shown in FIG. 1;

FIG. 3 is a partial front elevation, partially in section of a further embodiment of a container in accordance with the invention;

FIG. 4 is a vertical section of a portion of an embodiment of a dropping glass for connection to the container in accordance with the invention;

FIG. 5 is a front elevation, partially in section, showing a portion of a still further embodiment of a container in accordance with the invention;

FIG. 8 is a partially condensed front elevation, partially in section, of a further embodiment of a container in accordance with the invention, showing details of construction for opening said container and passing liquid therefrom; and FIG. 3 is an enlarged partial side view, partially in section, of an embodiment similar to the lower portion of the embodiment shown in FIG. 8.

Figure 6:
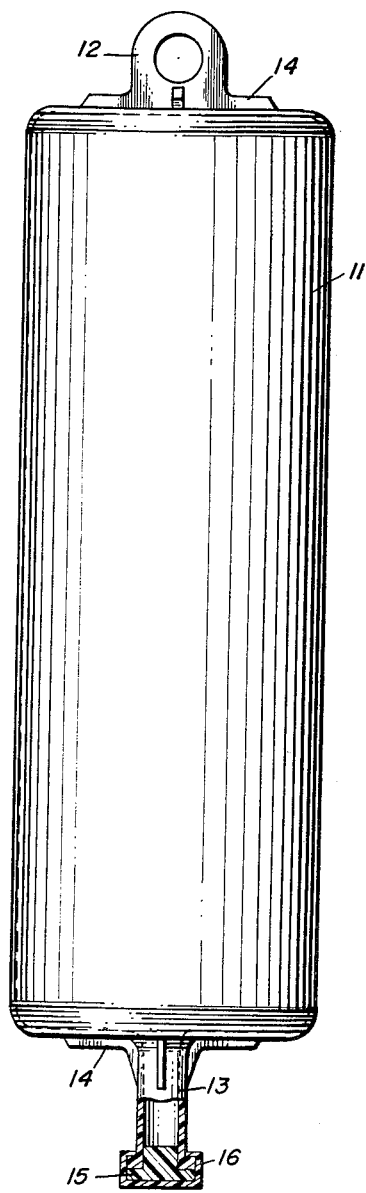
FIG. 6 is a front elevation, partially in section, of a further embodiment of a variation container in accordance with the invention.

The container in accordance with the embodiment of the invention is a seamless, flexible, thin-walled container, preferably having a cylindrical or oval cross-sectional shape and formed of a plastic having a melting point above about 100° C.

The shape of the container preferably approximates the shape of the conventional glass-infusing ampoules, and the container preferably has at its lower end a tubular neck in communication with the interior of the container for the removal and introduction of liquid and preferably has at its upper end a suspension eye for hanging the container in the conventional manner.

Referring to this embodiment as shown in the drawings, the container, as shown in FIGS. 1 and 2, has a seamless, flexible, thin-walled body portion $a$ formed of a synthetic plastic having a melting point of above about 100° C. Container body $a$ preferably has a cylindrical cross-sectional shape and is provided on its top with a suspension lug $o$. At the bottom, the seamless container body is provided with a neck in communication with the interior of the container, having a nipple or tubular shape. The neck is firmly connected with the main body portion by means of the reinforcing ribs $r$. The neck $c$ may be sealed by fusing or, as shown in FIGS. 1 and 2, may be provided with a rubber stopper $d$, which is for example secured by a flange closure $e$. Alternately, the neck $c$ may be sealed by an internal plug $g$, as shown in FIG. 3, or by a screw closure $f$, as shown in FIG. 5.

The container of this embodiment may be constructed of any suitable plastic having a melting point above about 100° C. In this connection, the new so-called high-density polyethylene, produced for example by the low-pressure polymerization of ethylene, has proven particularly suitable. This polyethylene, due to its high-molecular weight and crystal structure, has a melting point above about 100° C. Among material which may be used, polyethylene produced by Badische Anilin- and Soda-Fabrik of Ludwigshafen and sold under the name Lupolen or Lupolen H, having a molecular weight of about 50,000–60,000 and a softening temperature of about 112–115° C., may be mentioned as an illustrative example.

The plastic material of which the container is formed should be thin enough, so that the walls of the container are sufficiently transparent to render the contents visible and sufficiently flexible so that the same will automatically collapse in the form of a flat bag when the infusion solution is withdrawn. In the case of polyethylene containers, for example, wall thicknesses of for example 0.44–0.5 mm. have been found preferable.

The infusion containers in accordance with the invention may be produced, for example, by extruding a tube of the plastic material in a thermoplastic condition and inserting a piece of this tube of suitable length, while still in thermoplastic condition, in a mold having an inner shape corresponding to the outer shape of the container to be formed. The mold may, for example, be a cylindrical mold, which is divisible in two parts in the direction of its longitudinal axis. One end of the mold may have a nozzle with a mouthpiece corresponding to the neck of the container to be formed, and the tube may be placed in the mold so that the same extends over the mouth piece of this nozzle. The mold may then be closed and air or another suitable gas forced through the nozzle into the interior of the tubular piece which, while still in the thermoplastic condition, is expanded and forced smoothly against the inner wall of the mold, forming the desired container shape. The air between the tube and inner wall of the mold may be withdrawn in a suitable manner, as for example by means of channels provided for this purpose. The forming process can possibly be aided by physically drawing off the air from this space between the outer surface of the tube from which the container is formed and the inner surface of the mold.

In the forming process, the tube ends are fused together. The connection formed in this manner is preferably reinforced by a suitable reinforcement, as for example the reinforcement ribs $r$. The reinforcing ribs may serve at the same time as a connection for the suspension lug $o$ and the neck $c$.

It has been found that certain types of fungi and similar organisms may penetrate the thin-walled plastic containers, and accordingly the danger of fungus infection exists. Additionally, it has been found that loss of liquid in the container may occur due to evaporation and that a diffusion of oxygen from the air through the walls may occur. In accordance with the preferred embodiment of the invention it has been found that these dangers may be dependably avoided by providing the container bodies with a protective hydrophobic coating. Thin solid hydrocarbon coatings, such as paraffin coatings, have proven highly suitable for this purpose. Apparently paraffin has a special affinity for the plastic, such as polyethylene and the like, so that coatings thereof adhere very firmly and penetrate into the pores of the surface layer, assuring a dependable sealing. For this purpose there have proven particularly suitable lower melting point paraffins, as for example those having a melting point of about 40–60° C. The coating can be produced most simply by dipping the container into dilute, as for example a 3–5% solution of the paraffin in an organic solution, and allowing the excess paraffin to drain off. It is also possible to use a corresponding concentrated dispersion of the paraffin.

Coatings of plastics have also proven suitable for the same purpose. As suitable plastics there enter into consideration among others thermoplastics, such as polyvinyl chloride and the like. These plastics may also be applied to the outer walls of the container in the form of dilute solutions. The solutions of paraffins with synthetic resins penetrate into the pores of the container body and form a very uniform, thin, elastic film, which dependently prevents the migration of fungus, liquid, oxygen and the like. Fungi-static or fungicidal substances, such as p-chloro-m-cresol, may also be added to the solutions or dispersions producing the protective coatings in order to thereby dependently exclude fungus infection.

After the containers have been formed and preferably coated in the manner described above, the same are filled with the biological liquid, such as the blood or blood substitutes etc. The filling may be effected through the neck portion $c$ prior to the sealing, as for example by heat-sealing or by the closure members shown in FIGS. 1, 3 and 5. After the filling it is necessary to sterilize the container and the liquid contained therein.

In accordance with a preferred embodiment of the invention, the sterilization is effected by heating the container containing the liquid to the sterilization temperature, while enclosed in a mold, as for example of glass or metal, corresponding to the container shape.

With the use of this mold, higher sterilization temperatures can be used than would ordinarily be permissible. Thus, it is possible to effect the sterilization with the use of super-heated steam, as for example having temperatures above 100° C., i.e. 101° C., etc., without disturbing influences on the container. If, for example, the container is formed of polyethylene sold under the tradename Lupolen H, a sterilization at this temperature, as for example with super-heated steam, at 101° C. may be effected, though the manufacturer of Lupolen H does not recommend that the material be subjected to temperatures above about 85° C.

The filled container may, for example, be inserted in a cylindrical, rigid mold of glass or metal, which is preferably maintained in a vertical direction and sterilized with super-heated steam, as for example in an autoclave. If, for example, the container consists of high-density polyethylene, the heat-sterilization may be effected with super-heated steam for several hours, even under slight pressure at a temperature which is below the melting point of the polyethylene, but above 100° C. With the use of the mold, the container is protected against disturbing deformations. In order to prevent the penetration of non-sterile air into the containers during the cooling after the sterilization, the tube connection, i.e. the neck $c$ of the container, may be provided with a closure which permits the escape of air, but filters in a sterile manner air which might possibly enter the container. Thus, for example, a sterile gauze may be used for this purpose.

After the sterilization and cooling, the tube connection is fused closed below the closure, so that during the heat-sealing no unsterile air can enter and the danger of re-infection of the container is excluded. After the cooling, the container may be removed from the mold in a sterile, unchanged form.

The nature of the contents of the container may be identified in a simple manner by imprinting or stamping indicia, indicating its contents on the container.

The container may be used in the conventional manner, as for example by hanging the same by means of the lug $o$, and providing a connection from the neck $c$ to a suitable infusion device. Thus, for example, the container may be hung by means of the lug $o$ and the neck $c$ may be cut off above the point of heat-sealing or above the closure, such as the closure $d$ of FIG. 1, $g$ of FIG. 3 or $f$ of FIG. 5. The remaining portion of the neck $c$ may then be connected to a suitable infusion device. Thus, for example, the neck $c$ may be inserted over the connection nipple $h$ of the dropping glass $i$ (FIG. 4), so that the same is in tight sealing engagement with this nipple. The solution from the container will then pass automatically into the transfusing line or cannula. As the liquid flows out of the container, the atmospheric pressure causes the container to collapse and a vacuum lock, as occurs in connection with rigid containers, will not form. When, however, pressure equilibrium is established between the outer atmospheric pressure and the pressure within the infusion container, the discharge of the solution may be interrupted. This usually takes place when about 10–20 cc. of liquid are still present in the container. In this manner, penetration of air into the vein of the patient in connection with transfusions is prevented and the possibility of an air bubble is excluded. If, however, it is desired to empty the container completely, this may be done in a simple manner by piercing a hole in the upper part of the container, as for example with a sterile needle. The air, which passes through this hole into the ampoule, may be filtered sterile in a simple manner by covering the hole with a sterile gauze pad and placing an adhesive tape over the same. As an adhesive tape for this purpose there is preferably employed the so-called Tesa tape, which is a cellulose tape having an adhesive coating. The infusion containers in accordance with the invention have the further advantage that additives, such as therapeutic agents, may be injected in a simple manner into the infusion liquid and mixed well therewith. This may be effected, for example, with a simple hypodermic needle and a syringe directly through the container wall.

In accordance with a variation on the invention so far described it has been found that particularly favorable results may be achieved if the seamless, soft, flexible, thin-walled containers are formed of high-pressure polyethylene having a density within the specific range of about 0.921 to 0.925. Such containers, having a cylindrical cross-sectional shape and a density of about 0.922, are preferred. In this connection, containers formed of mixed polymers of high-pressure polyethylene and low-pressure polyethylene, having a density within the aforementioned range of about 0.921 to 0.925, and preferably 0.922, have also been found to be favorable. These containers may be formed by extrusion techniques in the manner already described.

Wherein polymer mixtures are used, the main constituent is always high-pressure polyethylene, the content of low-pressure polyethylene being within the range of about 10 to 20% by weight, the final density of the mixed polymer material being within said range of 0.921 to 0.925. Particularly preferred are containers formed from mixed polymers having about 85% high-pressure polyethylene and about 15% low-pressure polyethylene.

The thin-walled, seamless containers for biological liquids formed of high-pressure polyethylene or from mixed polymers of high-pressure polyethylene and low-pressure polyethylene and having a density within the aforesaid range, in accordance with the invention, possess desirable characteristics. Thus, the walls are soft and flexible and remain so during usage, so that the containers may collapse automatically upon emptying and easily fold up. Additionally, the walls are sufficiently transparent to permit constant visual inspection and the heat-sterilization of the contents may be carried out in these containers at temperatures well above the narrow temperature range of about 101 to 102° C. previously used for sterilization of conventional high-pressure polyethylene containers.

In accordance with the variation embodiment of the invention, sterilization of the high-pressure polyethylene containers or mixed polymer containers may be effectively carried out with super-heated steam flowing in contact therewith in autoclaves at temperatures of about 110 to 115° C. without damage to the container or deformation of the walls. It has been found particularly advantageous to use as infusion containers for example those high-pressure polyethylene or mixed polymer containers possessing a hose-like or ampoule shape, closed at both ends and being free from welded seams. In this way, excellent sterilization results may be obtained without disturbing secondary effects. Heretofore, sterilization at temperatures of from 110 to 115° C. have only been used for sterilizing glass objects.

Several modes of executing the sterilization of these thin-walled, flexible, seamless, high-pressure polyethylene or mixed polymer containers may be utilized. According to one such mode of execution, the container is filled with the biological liquid and placed into a preferably vertical mold or confining support of shape corresponding to the outside walls of the filled container. The mold may be, for example, formed of glass or metal. The container in contact with the abutting walls of the mold is thus heated with the aid of super-heated steam to the aforementioned sterilization temperature (110 to 115° C.). Upon cooling, the sterilized ampoule body or container is removed from the mold unchanged in shape and then sealed.

Another mode of execution involves the sterilization of the container filled with biological liquid, wherein the container is first sealed and no mold is necessary. In this case, the sealed container, is placed in an autoclave, which is partly filled with water, the autoclave is closed and then compressed air is passed into the autoclave under the same pressure which corresponds to the pressure generated within the sealed container during the heating to the sterilization temperature, i.e. 110 to 115° C. Pressures during sterilization of from 1 to 2 atmospheres may be applied.

According to a further mode of execution, the container is filled with biological liquid, closed for example by means of a tightly fitting screw cap located at the top of the container and placed completely within a rigid mold or confining space corresponding to the shape of the plastic container, which serves as the sterilization vessel. In this case, the top portion of the container as well is disposed within the mold or sterilization vessel. The lid of the vessel is then closed tightly over the top of the mold space and the heat-sterilization at 110 to 115° C. is carried out.

By employing suitably confining mold means, the walls of which are in abutting contact with the container walls, the nature of the contents may be identified in the same aforedescribed simple manner by imprinting or stamping indicia. Thus, the walls of the mold may carry such protruding indicia, so that during sterilization such indicia will be impressed against the thin-walled container and be transferred thereon.

The thin-walled, flexible, seamless high-pressure polyethylene or mixed polymer containers formed in accordance with this variation of the invention may also be suitably covered with a protective hydrophobic coating, preferably containing fungistatic or fungicidal substances, as described above. The sterilized, sealed container is conveniently dipped into a solution, dispersion or emulsion of coating material and thereafter preferably dried.

Hence, the construction in accordance with this variation of the invention provides thin-walled, flexible containers produced from seamless tubing without the need for undesirable welded seams. During the extrusion process, the containers may be provided with a hanging loop or lug at the top end and a connecting neck for communication with a suitable infusion device. For this purpose, the upper and lower ends of the preferably cylindrical container are conveniently reinforced, as for example by the provision for reinforcing ribs thereat. Such reinforcements assure stable attachment of said lug and neck extensions to the container, while preventing undue stresses which might otherwise cause leakage of biological liquid from within the container. Such reinforcing ribs also serve during discharge of the liquid from the container to govern the manner in which the container walls collapse and fold up.

In this connection, the biological liquid generally flows by gravity through the neck portion and into the infusion line. The cylindrical container is inwardly compressed and collapses as a consequence of the vacuum created in the emptying container and the air pressure acting on the thin walls from without. Upon reaching an equilibrium between the external air pressure and the vacuum within, the outflow of the liquid from the container is interrupted. At this point, there are usually about 10 to 20 cc. of liquid still present in an average size container. The folded-wall container then functions as a lip valve which advantageously prevents the penetration of air into the infusion line. Where blood transfusions are concerned, this feature eliminates any possible air embolus in the patient. The advantageous function, as above described, is assured in accordance with the invention by reason of the reinforcement at the container ends which prevent a complete collapse of the end portions of the container during outflow of liquid.

In accordance with the variation of the invention as aforementioned, FIG. 6 shows a preferably cylindrical container of the ampoule type in front view, having a thin-walled, flexible, seamles body portion 11. The container is formed of high-pressure polyethylene having a density of 0.921 to 0.925, but may also be formed from a mixture of high-pressure polyethylene and low-pressure polyethylene having a density within said range. At the top of the container a suspension loop or lug 12 is provided, while at the bottom a tubular-shaped neck 13, communicating with the interior of the container, is provided. Both the lug 12 and the neck 13 are firmly connected to the cylindrical body portion by means of reinforcing ribs 14. Neck 13 may be provided with a rubber stopper 15, which is secured thereon by a flange portion 16 in order to seal neck 13.

Figure 7:
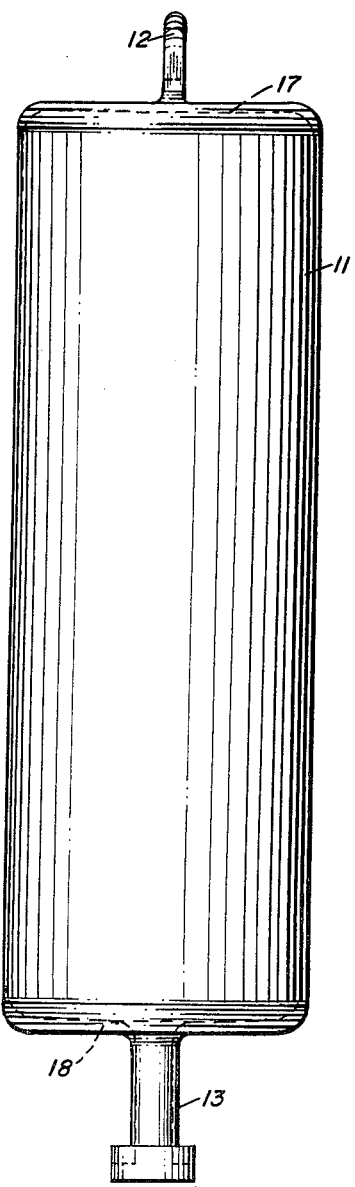
FIG. 7 is a side elevation of an embodiment similar to that shown in FIG. 6.

FIG. 7 illustrates the provision for alternate reinforcing means at the top and bottom portions of the container. In this embodiment the top portion 17 and bottom portion 18 are developed as thick-walled portions in contrast to the thin-walled sides of the cylindrical container.

By means of the reinforcing ribs 14 or the thick-walled portions 17 and 18, not only is there a stable attachment provided for lug 12 and neck 13, but also a construction which prevents the complete collapse of the thin-walled container body during the outflow of liquid therefrom.

As a further feature in accordance with the invention, any of the containers for biological liquids so far described may be equipped with a drop-counting chamber for the purpose of metering out the biological liquid, for instance into the blood stream of a patient, in precise controllable dosages. Such drop-counting chamber must be so constructed that, when attached to the container, for instance at neck 13, it assures a sterile closure even while stored for extended periods and when placed in operation may be securely connected to a suitable infusion device, such as a delivery cannula. Preferably, for optimum performance especially with respect to sterilization procedures, the drop-counting chamber is formed as a seamless element. Thus, the container and the drop-counting chamber may be produced of the same polyethylene material as an integral unit through extrusion and air-blowing operations in the manner described above.

The bottom portion of the drop-counting chamber, i.e. the end remote from the neck 13 of the container, in accordance with the invention, preferably outwardly converges and is provided with a more or less tubular extension, preferably of cylindrical cross-section, projecting therefrom. In this way, the infusion line connecting nipple may be conveniently attached to the container at said tubular extension by suitable means. For this purpose, external threads may be provided at the end of the tubular extension and internal threads may be provided at the corresponding end of the connecting nipple for screw attachment.

Where a drop-counting chamber is used, no closure is required for the neck of the container, since the same forms a passage which communicates not only with the container interior but also with the drop-counting chamber. Instead, the tubular extension is sealed for sterilization purposes, such as by a stopper or plug means, at its outermost end.

Inasmuch as sterile precautions must always be observed in these cases, a suitable piercing extension, serving as a cannula as well, is provided within the nipple. This piercing extension contains a passage which is capable of communicating with the main infusion line at the lower end of the nipple and also with the tubular space when the nipple is attached to the tubular extension. Hence, as the nipple is attached to the tubular extension, such as by screwing the same thereon, the piercing extension passes through the protective stopper or plug at the lower end of the tubular extension and provides flow communication between the counting-chamber and the main infusion line without the danger of upsetting the sterile condition prevailing. Of course, it should be noted that the nipple and piercing extension must be in sterile condition as well, sterilization thereof being effected by any conventional means, such as by autoclaving.

Specifically, in order to open the drop-counting chamber tubular extension closure to permit flow of liquid therefrom to the infusion line, the piercing extension is preferably axially disposed within the nipple and protrudes beyond the internal threaded portion thereof. This piercing extension may be of conical or needle configuration and is preferably provided with a lateral cannula opening therein for the channel which leads to the main infusion line at the opposite end of the nipple. The channel within the piercing extension may be bifurcated, terminating in two lateral cannula openings therein or a plurality of channel branches may be provided, each leading to a lateral cannula opening. The material of which the nipple and piercing extension are formed should have preferably greater hardness characteristics than the material of which the tubular extension closure plug or membrane is formed, such as a harder plastic material. In this way, as the piercing extension is inwardly displaced against said closure plug during attachment of the nipple to the tubular extension, such as by the threaded connection, the same will pierce said plug in a sterile manner so that the lateral openings are within the tubular extension in tight flow communication with the liquid contents of the counting chamber without detriment to the prevailing sterile conditions. It will be appreciated that the piercing extension opening or openings may be axially defined, but such construction is not completely advantageous, since a portion of the tubular extension closure plug might block said opening during the piercing operation. This would be due to the fact that the piercing extension would terminate in a round cutting edge rather than a simple piercing point, which would serve to punch out a circular disc from the tubular extension closure plug, said disc possibly occluding the cannula opening.

The infusion liquid is then allowed to pass into the main infusion line so as to completely displace the air therewithin. Injection into the patient may now take place safely, as no air is present in the infusion line which can pass into the blood vessels.

FIGS. 8 and 9 illustrate the additional feature of providing a drop-counting chamber for the container in accordance with the invention, with suitable attachment for an infusion nipple. The container, preferably of cylindrical cross-section, has a thin-walled, flexible, seamless portion 21, a tubular filling neck 22 having a seal 23, which may be provided after filling the container with biological liquid by welding shut the end of tubular neck 22. Reinforcement ribs 24 are defined at the upper end of the container to add firmness as aforesaid, although in lieu of ribs 24 the upper end of the container may also be formed of a thicker wall portion than the thin wall portion 21 of the container. Ribs 24 are suitably provided with apertures 25 through which a supporting hook may be passed for mounting the container. The bottom end of the container is constructed with a preferably integral connecting tube member 26 which contains a capillary flow passage 27. Tube member 26 leads to a drop-counting chamber therebelow which has a funnel-shaped or converging bottom wall, terminating in a central tubular extension 29 bearing external threads at 30. To ensure firmer support, tube 26 and drop-counting chamber 28 are connected to the container by reinforcing rib 31, which surrounds these elements and terminates at the shoulder portion of tubular extension 29. Screw nipple 32 has an internal threaded portion at 33, which cooperates with the external threaded portion at 30 of tubular extension 29, and an axially upwardly projecting piercing extension 34 of conical or needle-shape configuration. Piercing extension 34 is provided with bifurcated cannula branches ending in lateral openings 35. These branches communicate with main cannula conduit 36 terminating at the outer end of nipple 32 within infusion line seating portion 37. The portion of the cannula conduit in the piercing extension 34 is preferably of smaller flow cross-section than the main cannula conduit 36.

The nipple 32 may be readily and conveniently placed over tubular extension 29 to effect sterile infusion flow from the container by screwing the same onto said tubular extension 29. By this measure, piercing extension 34 is upwardly displaced and pierces closure plug or membrane 38 of tubular extension 29 without changing the prevailing sterile conditions. It will be appreciated in this connection that piercing extension 34 should be of harder and stronger construction than membrane 38 so that efficient and simple penetration will occur. Nipple 32 is optionally provided with a plurality of longitudinally extending ribs 39 to facilitate the manipulation of the nipple 32 during the screwing onto tubular extension 29.

The embodiment shown in FIG. 9 is similar to that of FIG. 8 and includes tubular extension 29', external threads at 30', membrane 38', nipple 32', internal threads at 33', cannula conduit 36' and infusion line seating portion 37'. However, piercing extension 34' is constructed as a needle point having a cannula conduit therewithin, which terminates in a lateral opening 35'. Piercing extension 34' is adapted to penetrate membrane 38' in the same manner as described in connection with FIG. 8, so that flow communication is attained between the container interior and the main infusion line which may be attached over infusion line seating portion 37'.

As described in connection with other embodiments of the invention, the container may be ventilated by notching the seam 23 of the neck 22 or by merely piercing the container wall with a hollow needle. Sterile conditions may be maintained by placing over the opening a folded gauze pad through which the inflowing air must first pass.

In like manner as heretofore stated, the container including the drop-counting chamber may be sterilized in an autoclave.

While the invention has been described in detail with reference to the specific embodiment shown, various changes and modifications will become apparent to the skilled artisan, which fall within the spirit of the invention and the scope of the appended claims.

What is claimed is:
1. A container for biological fluids and the like, which comprises a thin-walled, seamless plastic, collapsible container having both a tubular side wall portion and flat end portions extending substantially transversely to the longitudinal axis of the side wall portion, said container being composed of a 110° C. heat sterilizable mixed polymerizate of 80–90% by weight high pressure polyethylene and 20–10% by weight of low pressure polyethylene, said side wall portion in longitudinal section defining a pair of parallel straight surfaces such that the tubular side wall portion is resistant structurally to longitudinal collapse yet capable of partial lateral collapse, the end wall portions having a greater plastic thickness than the side wall portion for structural reinforcement of the container at the end wall portions and for preventing the complete lateral collapse of the container upon withdrawal of contents disposed therewithin without displacing said contents with air.

2. A container according to claim 1, wherein a drop-counting chamber is fixedly integrally attached at one end portion of said container in permanent flow communication therewith, the end portions of said container being provided with rib reinforcement means for retaining the shape of said container, and said drop-counting chamber being provided with a tubular extension having a closure membrane across the inside diameter thereof, said tubular extension being capable of flow communication with an infusion nipple conduit means upon attachment of a nipple means having a piercing extension containing a conduit means to said tubular extension by piercing said closure membrane.

3. A container according to claim 2, wherein said side wall portion and flat end portions are provided with a solid hydrocarbon protective coating for preventing the migration of fungi, liquid and oxygen therethrough.

4. A container according to claim 1, having a suspension lug at one end and a sealable, seamless neck integral therewith at the other end.

References Cited in the file of this patent
UNITED STATES PATENTS

| | | |
|---|---|---|
| 1,630,596 | Banff | May 31, 1927 |
| 2,261,065 | Kirchner | Oct. 28, 1941 |
| 2,328,569 | McGaw | Sept. 7, 1943 |
| 2,433,056 | Masci | Dec. 23, 1947 |
| 2,478,931 | Masci | Aug. 16, 1949 |
| 2,629,148 | Kollsman | Feb. 24, 1953 |
| 2,663,461 | Brown | Dec. 22, 1953 |
| 2,702,034 | Walter | Feb. 15, 1955 |
| 2,808,829 | Butler | Oct. 8, 1957 |
| 2,837,245 | Grebowiec | June 3, 1958 |
| 2,853,069 | Beacham | Sept. 23, 1958 |
| 2,856,929 | Gossett | Oct. 21, 1958 |
| 2,868,616 | Poitras | Jan. 13, 1959 |
| 2,949,712 | Bieberdorf | Aug. 23, 1960 |
| 3,017,883 | Dickinson | Jan. 23, 1962 |

OTHER REFERENCES

Neumann et al.: "The New Polyethylenes," from Modern Plastics, No. 32, August 1955, pp. 117–120, 122.

UNITED STATES PATENT OFFICE
CERTIFICATE OF CORRECTION

Patent No. 3,171,412                                              March 2, 1965

Bernd Braun

It is hereby certified that error appears in the above numbered patent requiring correction and that the said Letters Patent should read as corrected below.

In the grant, lines 1 to 3, for "Bernd Braun, of Melsungen, Germany," read -- Bernd Braun, of Melsungen, Germany, assignor to B. Braun, of Melsungen, Germany, a German firm, --; line 12, for "Bernd Braun, his heirs" read -- B. Braun, its successors --; in the heading to the printed specification, line 3, for "Bernd Braun, Traenkeluke 1, Melsungen, Germany" read -- Bernd Braun, Melsungen, Germany, assignor to B. Braun, Melsungen, Germany, a German firm --; column 2, line 35, for "FIG. 3" read -- FIG. 9 --; column 4, line 44, for "containers" read -- container --.

Signed and sealed this 27th day of July 1965.

(SEAL)
Attest:

ERNEST W. SWIDER                                      EDWARD J. BRENNER
Attesting Officer                                  Commissioner of Patents